United States Patent

Maillot

[15] 3,657,540
[45] Apr. 18, 1972

[54] NUCLEAR RADIATION MONITORING DEVICE WHEREIN A DETECTOR, A REMOTE SOURCE AND A MEASURING DEVICE ARE CONNECTED BY A SINGLE CABLE

[72] Inventor: Jean-Paul Maillot, Meudon, France

[73] Assignee: International Standard Electric Corporation, New York, N.Y.

[22] Filed: Oct. 3, 1969

[21] Appl. No.: 863,475

[30] Foreign Application Priority Data

Oct. 4, 1968 France.................................171196

[52] U.S. Cl....................................250/83.3 R, 250/83.6 R
[51] Int. Cl............................................................H01j 39/10
[58] Field of Search............250/83.3, 83.6, 83.6 P, 83.6 W; 313/93

[56] References Cited

UNITED STATES PATENTS 2,903,594  9/1959  Fearon et al........................350/83.6
2,909,663  10/1959  McFarlane............................250/83.6

Primary Examiner—James W. Lawrence
Assistant Examiner—Davis L. Willis
Attorney—C. Cornell Remsen, Jr., Walter J. Baum, Paul W. Hemminger, Percy P. Lantzy, Philip M. Bolton, Isidore Togut and Charles L. Johnson, Jr.

[57] ABSTRACT

A nuclear radiation monitoring device wherein a detector and a remote source and measuring device are coupled by a single coaxial cable via a resistor. The detector includes a Geiger-Muller counter tube, a low-to-high D.C. voltage converter, a pulse shaper and a monostable pulse repeater. The remote source supplies a low D.C. voltage which is converted to a high D.C. voltage for use by the detector. Signal pulses from the detector reach the remote measuring device substantially without alteration due to the aforementioned resistor which is chosen to have an impedance equal to the characteristic impedance of the coaxial cable.

4 Claims, 2 Drawing Figures

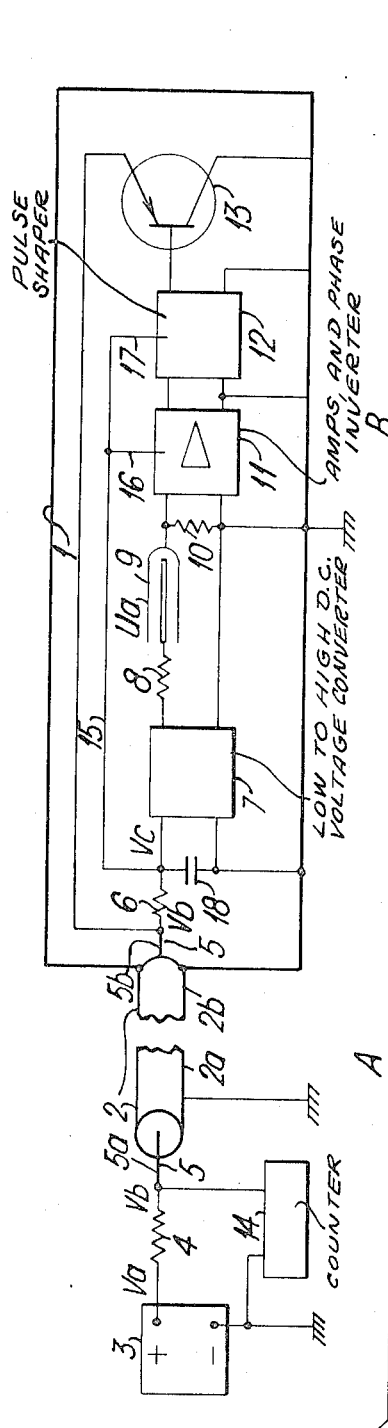
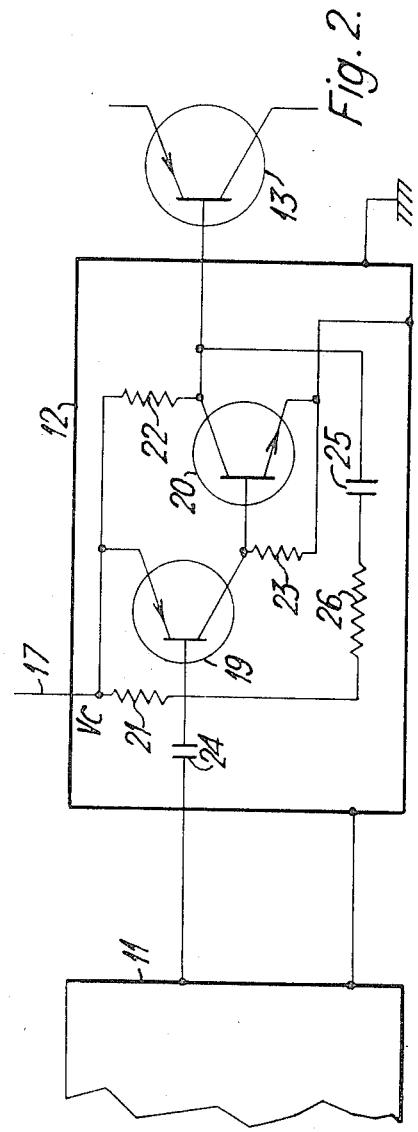
Inventor
JEAN PAUL MAILLOT
By
Attorney

NUCLEAR RADIATION MONITORING DEVICE WHEREIN A DETECTOR, A REMOTE SOURCE AND A MEASURING DEVICE ARE CONNECTED BY A SINGLE CABLE

BACKGROUND OF THE INVENTION

The present invention relates to a single-cable nuclear sounding or radiation monitoring device wherein the nuclear radiation detector, —which is the main part of the device and which generally operates under a high voltage, — can be connected to a measuring or counting apparatus and to a conventional source of energy by means of a long single-conductor cable without this cable acting in altering the results of the measure or count.

There are known sounding devices for nuclear radiation, wherein energy can be supplied by means of a conductor as a direct current, whereas intelligence is lead back on the same conductor as currents having the character of pulses. In these known devices, the link between the sound (which is practically formed of the detecting device only) and the supply and measure parts generally is provided by a coaxial cable the outer conductor of which forms the mass pole of the whole.

A proper realization of such devices shows numerous difficulties. Three main difficulties will be discussed hereunder.

A first difficulty lies in this that the nuclear detection tube operates under relatively high voltages, as about 0.2 to 5 kV, so that the cable must be a high-grade one so as to withstand so high a voltage without any risk.

A second difficulty is connected to the fact that in those known devices, the sound comprises a single detector device (e.g. a Geiger-Muller counting tube) and that separator parts must be provided between the two functions of measuring and supplying, since the components of the measuring and energy-supplying circuits are located at the other end of the connecting cable. These separator parts will be elaborate ones, so that, due to the high voltages involved, the use of such devices is difficult for non-specialized users.

A third difficulty lies in the fact that the terminating impedances of the detector side as well as measure side, generally are much higher than the characteristic impedance of the connecting cable: this results in multiple reflections and in warping the measure signals, said measure signals having a pulse form appropriate for counting or integrating in a suitable counting circuit. Such warping is more severe as the cable is made longer, the pulse duration (or width) sorter, and the recurrence rate of the pulses, — i.e., the number of bits per second, or the rate of counting — greater. This warping is a serious drawback since, if a given length of cable is connected between the detector and the measuring or counting apparatus when the device is calibrated by means of a known source of nuclear radiation, the readings can be faulty when the device will be used with a different length of cable. Further, it is not possible to determine a factor of correction as such factor will depend on the characteristics of this cable.

In order to obviate that third drawback, systems have been developed that use two cables, one for providing the supply voltages, the other for transmitting the pulses from the detector to the counting circuit the impedance of which is made comparable to that of the cable by using a special amplifier called an impedance adapter. Such devices, besides requiring the use of two separate cables, or a single cable having several leads, which as a rule are inflexible and expensive, do not obviate the drawbacks connected to the use of a high voltage on a lead of the supply cable. Moreover, the special amplifier associated with the counting circuit is of a rather complicated design.

SUMMARY OF THE INVENTION

The object of this invention is therefore a nuclear radiation sounding device which will comprise electrical devices designed so as to obviate the drawbacks of the known devices. This advantageous result is obtained in that the envelope of the sound proper includes, beside the detector device (e.g. a Geiger-Muller tube) suitable electronic circuits, including a direct voltage converter, a pulse-shaping device and an impedance adapter, designed so that the pulses generated in the detector part, after their being shaped, are sent through the cable without any substantial warp, whereby the electrical parts located at the other end of the cable are much simplified, as they can comprise nothing but a low-voltage direct-current supply of a conventional type, and a resistor of same value as the characteristic impedance of the cable at the terminals where the pulses to be counted are tapped by well-known means.

An electric device using a nuclear radiation sound, according to this invention, comprises a supply line formed of the central lead of a coaxial cable extending between two points, A and B.

At point A there is set up a low-voltage direct-current supply, one pole of which, e.g. the positive one, is connected to the central lead through a resistor, while the other pole is connected to the outer lead of said coaxial cable and which in turn is connected to ground. At point B, the perusing circuit, comprising mainly the nuclear radiation detector, has one terminal connected to the central lead, the other terminal being connected to the outer lead of said coaxial cable.

The sound comprises:
- a D.C. converter from low to high voltage, the latter being stabilized by means of a regulating circuit;
- a nuclear radiation detector part, e.g. a Geiger-Muller tube, which yields pulses at a rate which defines the strength of said radiation;
- an amplifier and phase inverter for said pulses;
- a shaping device for said pulses, either amplified or not; and
- an electronic switch acting as an impedance adapter and due to which the pulses can be transmitted without any substantial warp through the cable central lead to spot A, where they are counted at the terminals of the resistor arranged at the outlet of the low-voltage supply.

The parts that are included in the sound can be set in a metal box connected to the outer lead of the coaxial cable, the whole of both forming the electric ground of the equipment.

Other objects and features of this invention will appear from the following description illustrated by the appended drawings which shown schematically, as a non-limitative example, a particular embodiment of the present invention.

BRIEF DESCRIPTION OF THE DRAWINGS

FIG. 1 schematically shows the sounding device according to the invention, associated with electrical parts arranged outside the sound for an easier understanding of the following description.

FIG. 2 is an electrical circuit diagram of a portion of the device shown in FIG. 1.

DESCRIPTION OF THE PREFERRED EMBODIMENT

As shown in FIG. 1 of the drawings, a metal casing 1 is placed at B where the nuclear radiations will be detected. It contains the parts that will be described hereunder and that form the sound proper. This metal casing, which forms the electric ground of the equipment, is connected, by means of a coaxial plug (not shown) to the outer lead of a coaxial cable 2 (the ends 2a, 2b whereof can be seen) which provides the link between the sound proper and the supply and measuring or counting circuits placed at point A.

In order to provide the electric energy required for supplying the devices arranged inside the metal casing 1, a D.C. source 3, of a conventional type, and yielding a relatively low voltage Va, is formed e.g. of a battery of 6-V. cells. It has one of its terminals at ground and the other terminal e.g. the positive one, connected through a series resistance 4 to the central lead 5 (the ends 5a, 5b of which can be seen) of the coaxial cable 2. Resistor 4 has a value very near that of the impedance of the said coaxial cable.

Central lead 5 at its end 5b engages the space defined by the metal casing 1 by means of the coaxial plug mentioned above, and there through a series resistor 6 of some tens of ohms it extends to the inlet of an electronic D.C. converter stage 7 which converts the low voltage into a stabilized high voltage. This kind of devices is well known in the art. High voltage Ua provided by stage 7 is applied through a protecting resistance 8 to the anode of a Geiger-Muller counting tube 9. This voltage Ua can be between 0.5 and 2kV, according to the kind of system. It is stabilized in stage 7 so as to avoid the action of the modifications of the mean current through counting tube 9 when in operation, and possibly the action of the modifications of the low-voltage Va at the terminals of source 3.

The pulses generated from the nuclear radiation in the counter tube 9 are tapped from a resistor 10 arranged in series with the cathode of the said counter tube. As an example, resistor 10 can be of the order of a kilohm in the case of a halogen-filled Geiger-Muller counting tube.

Positive voltage pulses that appear at the terminals of resistor 10 are applied to the inlet of an amplifier and phase-inverter stage 11 equipped with transistors, of a conventional type. Negative pulses are collected at the outlet of stage 11, said pulses having an amplitude of about 0.5 Vc to 0.8 Vc, Vc being the D.C. voltage at the input of stage 11, and very little different from Va at the terminals of source 3 for reasons set forth below.

In practice, the negative pulses issuing from stage 11 have an amplitude which varies with temperature, the width thereof depending on the shape of the pulses at the terminals of resistor 10, and therefore from the counting rate in the Geiger-Muller tube 9.

In accordance with the invention, this drawback will be obviated in conducting the negative pulses from stage 11 into a pulse-shaping stage 12, a specific embodiment of which, using transistors, will be described below. Taking into account the arrangement of stage 12, the negative voltage pulses collected at the outlet of that stage will have an amplitude near the D.C. voltage Va of source 3, and a width which can be adjusted at will to any desired value owing to a simple circuit used in stage 12.

Negative pulses from stage 12 are directly applied to the base of a PNP-type transistor 13 in an emitter-follower arrangement. The emitter of said transistor is connected to the central lead at its sound engaging end 5b, before resistor 6.

When there are no pulses originating from the Geiger-Muller counter tube 9, the emitter-collector gap in transistor 13 shows a high impedance, whereas this gap shows a very low impedance when a negative pulse having an amplitude that nears Va appears at the base of the said transistor. In other words, during the very short time of a pulse which corresponds to a bit delivered by tube 9, central lead 5 of the coaxial cable 2 is substantially put to ground at its junction 5b with resistor 6.

The short-circuit pulses provided thus are transmitted through coaxial cable 2 and appear without any warp at the terminals of resistor 4, since this resistance is substantially equal to the characteristic impedance of the coaxial cable 2, and as the inner resistance of source 3 is assumed to be very low, there is no pulse reflection at the inlet 2a of the coaxial cable. The pulses that appear at the terminals of resistor 4 can be handled by conventional integrating or counting means. These are indicated by block 14, since they do not pertain to the scope of the present invention.

Stages 11 and 12 are supplied with low-voltage direct current by wires 15, 16 and 17. These stages consume current only during the very short pulse times, so that the mean current remains very low. Stage 7 has also a very small direct current consumption. This results in the direct voltages Vc and Vb, as measured respectively at the inlet of stage 7 and at 5a of coaxial cable central lead 5 being very little lower than voltage Va at the terminals of source 3. This further results in that said source 3 can be a small capacity one, and formed e.g. of a current cell battery.

During the very short pulse times, the voltage at the inlet of the sound becomes null because of the substantial short circuiting according to the operation described above. At those times, stages 7, 11 and 12 are no longer supplied from source 3. By arranging a capacitor 18, having a relatively large value, at the input of stage 7, these breaks in the supply will be avoided, since said capacitor retains a nearly constant charge during the short-circuit times.

An example of the pulse-shaping device which can be used for stage 12 is shown in FIG. 2, wherein parts which operate like those of FIG. 1 are designated with the same reference numbers as in that figure.

Transistors 19 and 20 are complementary ones, i.e. transistor 19 is of the PNP type, whereas transistor 20 is of the NPN type. The circuit composed of the transistors 19 and 20 and resistors 21, 22 and 23 is fed with the low D.C. voltage Vc and forms a so-called monostable device. The connection between the output of stage 11 and the base of transistor 19 is preferably provided by a capacitor 24, in order not to disturb the operation of the monostable device by the direct voltage at the outlet of stage 11.

When there are no pulses coming from stage 11, the two transistors are inhibited, but as soon as there appears a negative pulse both at once become conducting. The conduction time is adjusted by the reactance comprising capacitor 25 in series with resistor 26. This time is of the order of some microseconds, and it defines the width of the output pulses from stage 12 that are applied to the base of transistor 13. Thus, this pulse width becomes independent of variations of amplitude and duration of the pulse at the input of the said stage.

It is clear that the device could be supplied by a source 3 of the opposite polarity, without exceeding the scope of the invention. The high D.C. voltage, of a negative polarity, which appears at the output of the converter, would be then connected through resistor 8 to the cathode of the Geiger-Muller tube 9. The count pulses, which would be negative, would be tapped from the anode of the said tube, and this anode would be connected to ground through resistor 10. All transistors of the PNP type would be replaced by NPN type transistors, and vice-versa. Then, the count pulses collected at the terminals of resistor 4 would have a positive polarity.

It will be understood that one will not go beyond the scope of the invention when the circuits shown in FIGS. 1 and 2, and which have been assumed as formed of several components, can be formed of solid circuits; and even when the Geiger-Muller counter tube will be replaced by a semiconductor or other particle detector.

I claim:

1. A nuclear radiation monitoring device comprising:
   detecting means having a conductive housing;
   a source of power;
   a coaxial cable coupling said detecting means to said source, one lead of said cable providing a signal path and the other lead of said cable being connected to said housing and to ground;
   measuring means coupled to said power source and to said coaxial cable; and
   a resistor having a value substantially equal to the characteristic impedance of said coaxial cable, said resistor connecting said source to said one lead, the junction of said resistor and said one lead being connected to said measuring means; wherein said radiation detecting means comprises:
   a radiation particle detector;
   a low-to-high D.C. voltage converter coupled to said particle detector and providing a regulated supply therefor;
   amplifying means connected to said particle detector for amplifying the output signal of said detector; and
   a switch connected between said one lead of the coaxial cable and ground, said switch being controlled by the signal from said amplifying means.

2. A nuclear radiation monitoring device, according to claim 1, wherein the input circuit for said low-to-high D.C. voltage converter is coupled to ground via a capacitor.

3. A nuclear radiation monitoring device, according to claim 1, wherein said switch comprises a transistor, so coupled between said amplifying means, said housing and said one lead of the coaxial cable, that said transistor conducts when it receives a signal from said amplifying means thereby grounding said one cable lead.

4. A nuclear radiation monitoring device, according to claim 3, further including pulse shaping means connected between said amplifying means and said transistor comprising a monostable multivibrator including two complementary transistors which are inhibited when no signal is transmitted from said amplifying means and which both conduct when such signal is provided by said amplifying means.

* * * * *